United States Patent [19]

Zola

[11] 3,784,978

[45] Jan. 8, 1974

[54] SELF-CHECKING DECODER

[75] Inventor: Meyer Joseph Zola, Columbus, Ohio

[73] Assignee: Bell Telephone Laboratories, Incorporated, Murray Hill, N.J.

[22] Filed: Feb. 14, 1973

[21] Appl. No.: 332,349

[52] U.S. Cl. 340/146.1 AB, 235/153 A, 340/347 DD

[51] Int. Cl. .......................................... H03k 13/34

[58] Field of Search........... 340/146.1 AB, 347 DD; 235/153 A

[56] References Cited

UNITED STATES PATENTS 3,722,107 3/1973 Müller.......................... 340/347 DD

*Primary Examiner*—Malcolm A. Morrison
*Assistant Examiner*—R. Stephen Dildine, Jr.
*Attorney*—W. L. Keefauver et al.

[57] ABSTRACT

The self-checking decoder of the present invention includes a number of logic NAND gates arranged to process input address and parity signals in such a manner that if a fault exists in the input codes or the decoder, the decoder will either properly decode the input address or will signal the presence of the defect. In addition, if invalid code combinations are applied to the circuit on a regular or selective basis, the circuit is arranged to signal the existence of faults of which the circuit was tolerant.

11 Claims, 3 Drawing Figures

SELF-CHECKING DECODER

BACKGROUND OF THE INVENTION

1. Field of the Invention

This invention relates to decoders for use in data processing and related systems and more particularly to self-checking decoders for use in such systems.

2. Prior Art

In order to check the validity of a one-out-of-*n* decoding selection in prior art decoders, it has been common practice to provide additional circuitry for detecting the presence of a single signal on only one of *n* output leads. Such additional checking circuitry involves significant complexity since there are a number of valid output signals to be recognized. Such complex checking circuitry is not only costly but, due to its complexity, is itself vulnerable to the incidence of faults. Not unimportantly, such checking arrangements also introduce significant delay into the decoding operations being performed.

It is also a common requirement in prior art decoders that more costly double-rail input signals be provided since single-rail input signals substantially increase the possibility of an input address line being faulty thereby causing the selection of an incorrect address.

One prior art circuit, that disclosed in D. C. Jessep, Jr., U.S. Pat. No. 3,585,377 issued June 15, 1971, shows a decoding arrangement for detecting failures in decoding circuits, which arrangement avoids some of the difficulties of prior art circuits mentioned above. In accordance with the Jessep patent, a decoder comprises layers of logic gates. Each of the gates in a layer of gates is designed to fail to a particular state. Further, all even-numbered layers are arranged to fail to one predetermined state and all odd-numbered layers are arranged to fail to a second predetermined state. A fault in a given logic gate results in that gate assuming its specified fault state which, in turn, produces a decoder output signal indicating a failure in the system.

Clearly, logic units which fail to a predetermined state are more difficult to design and implement and are, hence, more costly than unmodified "off-the-shelf" gates. Similarly, it is significantly more difficult to design and implement decoders which require combinations of different failure mode logic gates rather than combinations of identical logic gates.

It is therefore an object of the present invention to provide simpler, more economical one-out-of-*n* self-checking decoders.

SUMMARY OF THE INVENTION

The present invention, in typical embodiment, performs a 1-out-of-*n* selection by performing logic operations on both parity and address signals. The presence of a single fault in the decoder, or invalid input codes are readily detected using the present invention. Further, the circuit of the present invention is tolerant of certain faults and will continue to correctly decode valid input code combinations even though faults exist in the circuit. The decoder, in preferred embodiment, includes an arrangement of identical logic units for processing both information (address signals) and parity signals, in combination, to provide a more powerful error-detecting facility.

The decoder of the present invention, in typical embodiment, advantageously combines the input address bits applied to the decoder with the parity bit associated with those address bits in such a manner as to provide the circuit with a self-checking feature. More particularly, the additional circuit states provided when the address and parity bits are processed in combination permit the circuit to correctly decode certain combinations of input signals in spite of the circuit fault and to signal the existence of the fault when certain other combinations of input signals are processed.

It is therefore a feature of the present invention that decoding circuitry includes logic circuitry for processing information and parity signals in combination to signify faults in that decoding circuitry.

It is a further feature of the decoders of the present invention that single-rail input circuitry is provided without degrading the fault detection capability of those decoders.

DESCRIPTION OF DRAWING

A complete understanding of the present invention and of the above and other objects, features and advantages thereof may be gained from a consideration of the following detailed description of an illustrative embodiment thereof shown hereinbelow in connection with the accompanying drawing in which.

DETAILED DESCRIPTION

Figure 1:
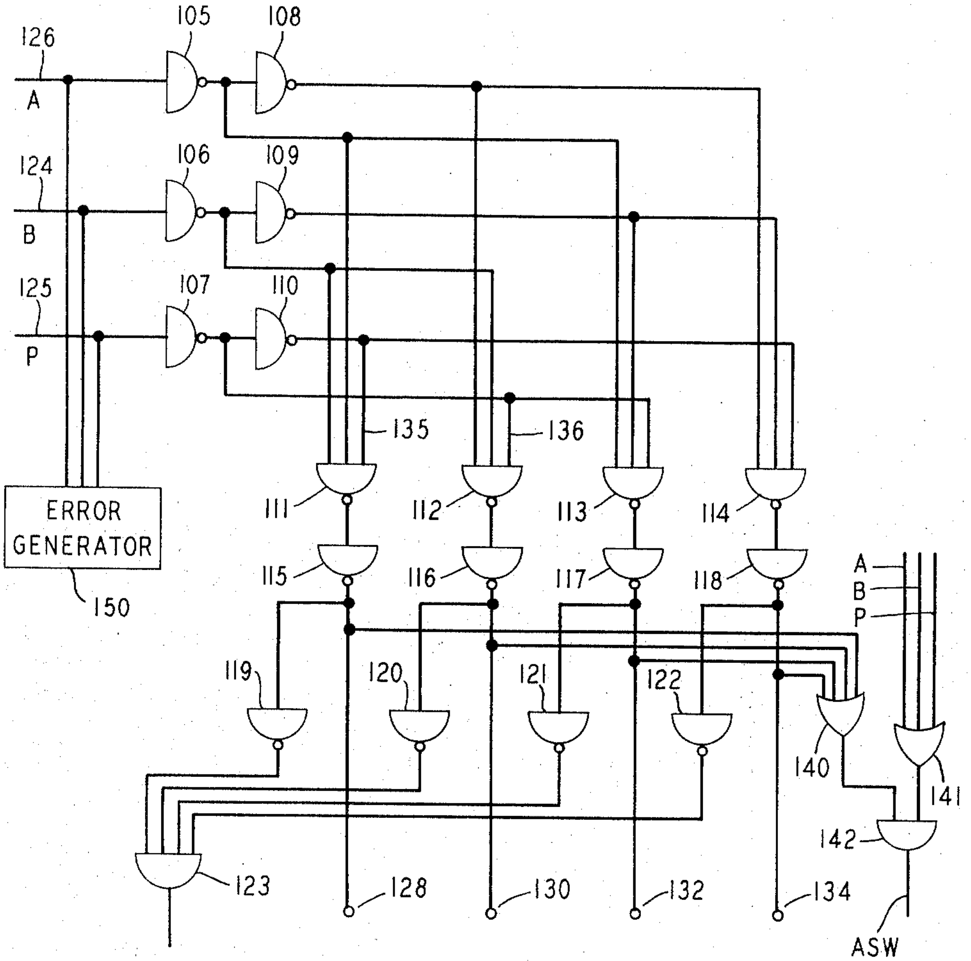
FIG. 1 shows a 1-out-of-4 decoder in accordance with the preferred embodiment of the present invention.

FIG. 1 illustrates a self-checking decoder in accordance with one embodiment of the present invention. In particular, the decoder of FIG. 1 is a 1-out-of-4 decoder; that is, only one out of the four output leads is accessed or selected (carries a logic 1 signal) for each combination of two address bits, A and B. The input lead, 125, labeled "P" in FIG. 1 inputs the parity signal for the address bits A and B which are applied to leads 126 and 124, respectively. The parity signal appearing on lead 125 is calculated elsewhere and transmitted with the address bits A and B to the decoder in accordance with well-known practice. Although odd parity will be considered to be correct parity in the instant discussion, it will be apparent to those skilled in the art that even parity can be used just as well.

The logic elements 105–122 shown in FIG. 1 are NAND gates of standard design. Logic elements 105, 106 and 107 are the first input gates, gates 108, 109 and 110 are the second input gates and gates 111–118 are the decoding and inverting gates. It is apparent generally and from an analysis of the circuit of FIG. 1 that there are four possible distinct combinations of the address bits A and B and, for each such combination, there is a correct parity bit. In accordance with the operation of the 1-out-of-4 decoder shown in FIG. 1, only one output lead will have a logic 1 signal at its output for each 2-bit address applied to leads 124 and 126, providing correct parity and its complement are applied to the gates 111–114 in FIG. 1. In particular, in the absence of faults in the circuit, Table I illustrates the address bits, related parity bits and output leads accessed for each two address bits and correct parity signal.

TABLE I

| Input A | B | P | Output Lead No. |
|---|---|---|---|
| 0 | 0 | 1 | 128 |
| 1 | 0 | 0 | 130 |
| 0 | 1 | 0 | 132 |
| 1 | 1 | 1 | 134 |

In order to clarify the subsequent discussion, it is considered useful to trace the operation of the circuit of FIG. 1 for at least one valid and one invalid input code combination. The valid code, chosen arbitrarily, is A = 0, B = 1, P = 0. The input signals A, B and P are applied to input leads 126, 124 and 125, respectively. Each of the input signals is inverted by one of the first input gates 105, 106 or 107 as shown in FIG. 1 and applied to a second inverting gate. The second input gates are 108, 109 and 110. Using the input code chosen, the output signals for the gates 105, 106 and 107 are, respectively, A' = 1, B' = 0, P' = 1, where ' indicates complement, e.g., A' is the complement of A. Analogously, the signals at the output of the second input gates, 108, 109 and 110, are the inverse of those output signals which, in the absence of circuit faults, are the same as the input signals.

It is a simple matter to trace the interconnections between the input gates and the decoding gates 111–114. When this is done, it is apparent that the input signals to each of the gates 111, 112 and 114 includes at least one 0. Consequently, the outputs of those gates (NAND gates, recall) are 1's and the outputs of the inverters 115, 116 and 118 are 0's. The inputs to gate 113, on the other hand, are all 1's. The output of gate 113 is therefore 0 and the output of inverter 117 is 1. Lead 132 is thus accessed and this result agrees with the entry in Table I above.

For the sake of completeness, consider the invalid input code combination A = 0, B = 1, P = 1.

Following a procedure similar to that described above for the valid code combination, it is apparent that none of the output leads 128, 130, 132 or 134 is selected for that invalid input code. In particular, none of the decoding gates 111–114 has applied to it logic 1's only. Consequently, no 0's are applied to inverters 115–118 to produce a 1 at one of the selected outputs, i.e., the invalid code produces an all-0's condition on the output leads.

Briefly, the operation of the circuit of FIG. 1 is such that a single fault in that circuit causes the circuit to produce either the correct output signal or to generate a "no output" condition. The circuit is fault tolerant and the correct output signal is produced when the circuit fault does not affect the decoding. For example, if the output of any one of the gates 108–110 is held at the logic 1 level because of a defect, then the correct output is produced for every valid code applied to the leads 124, 125 and 126. Illustratively, if gate 109 is open-circuited and signals corresponding to A = 1, B = 0, P = 0 are applied to leads 126, 124 and 125, respectively, the circuit will correctly decode the input combination.

A "no output" condition is signified in one embodiment by the decoder's failure to access utilization circuitry, in one instance, a matrix board in a memory system. In particular, by adding an OR gate to that utilization circuitry to logically OR the signals appearing on the matrix board output lines, a decoder "no output" condition can be detected. The pulse generated when a matrix board is accessed will be designated the all-seems-well (ASW) signal. Correspondingly, the "no output" condition is said to be a failure of the ASW signal. This signal can also be generated by ORing (as by using OR gate 140 in FIG. 1) the outputs appearing on leads 128, 130, 132 and 134 and connecting the output to an AND gate such as 142 in FIG. 1. The other input to the AND gate 142 is the output of an OR gate 141 which has A, B and P as inputs. Thus, when any valid input is applied on leads 124–126 (having at least one 1), and an output appears on the output leads, an ASW signal is generated for the input code combination.

Figure 2:
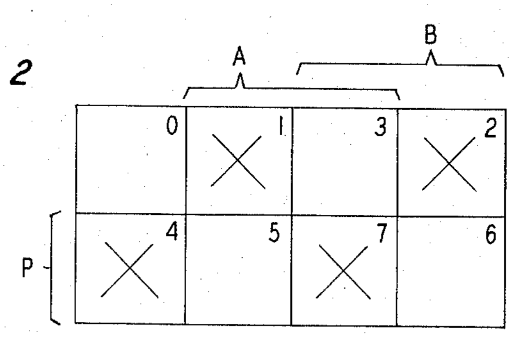
FIG. 2 shows the Karnaugh map for the circuit of FIG. 1.

The manner in which the error detection is accomplished in the circuit of FIG. 1 will become clear from a consideration of FIG. 2, which shows the Karnaugh map for the circuit of FIG. 1. Referring to FIG. 2, it is apparent that there are four valid states (signified by an "X" in appropriate boxes in the Karnaugh map) and four invalid states for the circuit of FIG. 1. The added invalid states result from the use of the parity bit in combination with the address bits in the decoding circuit of FIG. 1, as will become clear from the following discussion.

The error-detecting feature of the circuit of FIG. 1 can be most conveniently analyzed by reference to the failure modes of the circuit. The first failure mode relates to faults in the input interconnections. In particular, if any of the input leads 124, 125 or 126 is open-circuited or shorted to ground, then an invalid state may result, thereby generating a "no output" condition or ASW failure. For instance, consider the input combination A = 1, B = 0, P =0 corresponding to state 1 in the Karnaugh map of FIG. 2 applied to the decoder of FIG. 1. If the lead 126 is shorted to ground, the signal on lead 126—that is, A—will assume the incorrect value, 0. Hence, the input combination appearing on leads 124, 125 and 126 will be A = 0, B = 0 and P = 0 corresponding to state 0 in the Karnaugh map of FIG. 2. Clearly, from the Karnaugh map of FIG. 2, this is an invalid state for the circuit of FIG. 1. As a result, no matrix boards will be accessed since the output signals appearing on leads 128, 130, 132 and 134 will be all 0's. Conversely, it is obvious that if lead 126 is open-circuited, the input signal on lead 126 will be the same as that intended, hence, a valid state will be decoded in spite of the fault.

The second failure mode relates to faults in any of the first input gates, gates 105, 106 or 107. If an input word is such that the failed gate does not effectively invert the input signals, the correct output combination will be produced. Consider the input code A = 1, B = 0, P = 0 applied to the circuit of FIG. 1 in which gate 105 is assumed to fail low. Clearly, the signal on input lead 126 has not been effectively inverted and output lead 130 will be correctly selected. However, in the last example mentioned, if gate 105 fails high, the signal on input lead 126 is effectively inverted and no output lead is selected resulting in an ASW failure.

The third failure mode relates to faults in any of the second input gates 108, 109 or 110. If one of those gates is shorted to ground, the output signals from that gate will transmit 0's to certain ones of the decoding gates 111–114. 0's at these gates prevent their producing a correct 1-out-of-$n$ signal for proper accessing of output circuitry; hence, a "no output" condition is produced. For example, if the code $A = 1, B = 0, P = 0$ is applied to the input leads 126, 124 and 125, respectively, and gate 108 fails low, none of the leads 128, 130, 132 or 134 will be selected and there will be an ASW failure. If, on the other hand, the second input gate is open or fails high, there is a correct output signal for every valid input code. Consider the input code A = 1, B = 1 and P = 0. If gate 110 is assumed to fail high, the input code will be correctly decoded. Thus, the circuit of FIG. 1 is clearly fault tolerant and can operate effectively under certain conditions even though an element is faulty.

Since the failure in this and the other failure modes should not go undetected even though no direct fault has been introduced in the decoding combination, the fault must be detected. This is accomplished by applying to the input gates an invalid code and testing the ASW signal. For example, if gate 110 is open-circuited, and an invalid code such as A = 0, B = 0, P = 0 or A = 1, B = 1, P = 0 is applied to the circuit of FIG. 1, the output leads 128 and 134, respectively, will be selected and an ASW signal generated. The presence of an ASW signal in response to an invalid code signifies faulty operation of the decoding circuit; conversely, an ASW failure signifies correct circuit operation under the mentioned test conditions. In prior art arrangements, circuitry is often provided for checking the operation of the check circuitry itself. Applying invalid code combinations on a regular or selected basis to detect defects, of which the circuit is tolerant, corresponds to checking the checking circuit; however, of course, no additional circuitry is required to effect this result.

The fourth failure mode relates to faults in the decoding gates 111–114 and, in particular, to faults in the input diodes in those gates. In one embodiment, the diodes, one per input, are connected in standard fashion to the base of a grounded emitter transistor. If the diode in gate 111, which diode is connected to lead 135, is open-circuited, for example, output lead 128 will be correctly selected when the valid code combination A = 0, B = 0, P = 1 is applied to the circuit of FIG. 1. Similarly, if the diode connected to lead 136 in gate 112 is open-circuited, lead 130 will be correctly accessed when the code A = 1, B = 0, P = 0 is applied to the input terminals 126, 124 and 125, respectively.

In order to detect the existence of the open-circuited diode, it is necessary to apply an invalid code combination to the circuit. The particular invalid code which will signify this fault is the valid code which will select the output lead associated with the gate including the defective diode modified to the extent that the bit corresponding to the faulty diode is inverted. Thus, to detect the faulty diode connected to lead 135 in FIG. 1, all that is necessary is to apply the invalid code, A = 0, B = 0, P = 0 (generated, for example, by error generator 150 in FIG. 1) to the circuit. If the diode is open-circuited, lead 128 will be accessed in spite of the invalid code. Similarly, if the invalid code A = 1, B = 0, P = 1 is applied to the circuit and the input diode connected to lead 136 is open-circuited, output lead 130 will nonetheless be selected signaling a fault in the gate 112.

The last failure mode involves errors on the output lines 128–134 of FIG. 1. If any of these lines fails low and that line is selected, there will be an ASW failure. Otherwise, the failure does not affect decoding.

If any of the lines 128, 130, 132 and 134 fails high, however, it can easily be detected by means of an all-0's check arrangement. In accordance with such an arrangement, an additional inverting gate is provided at the output of each of the decoding gates 115–118 (inverting NAND gates 119–122) in FIG. 1 and the outputs from these inverting gates 119–122 is applied to AND gate 123. Thus, if no input signals are applied to the circuit of FIG. 1, there should be a 0 output on lines 128, 130, 132 and 134 and a 1 output from gate 123. Under such conditions, no output from the all-0's check AND gate 123 signifies a decoding gate output held high.

In order to more fully illustrate the teachings of the present invention, it is considered appropriate to consider the step-by-step construction of a 1-out-of-8 decoder in accordance with the teachings of the present invention. Specifically, assume that it is desired to provide a self-checking decoder responsive to a 3-bit address and one parity bit. Initially, it is convenient to construct a table specifying the combinations of address and parity bits. Table II includes such information for the 3-input decoder.

TABLE II

| A | B | C | P |
|---|---|---|---|
| 0 | 0 | 0 | 1 |
| 1 | 0 | 0 | 0 |
| 0 | 1 | 0 | 0 |
| 0 | 0 | 1 | 0 |
| 1 | 1 | 0 | 1 |
| 1 | 0 | 1 | 1 |
| 0 | 1 | 1 | 1 |
| 1 | 1 | 1 | 0 |

Once the desired table (or corresponding Karnaugh map such as that shown in FIG. 2 for the circuit of FIG. 1) has been specified, the decoding gates are defined. Specifically, by reference to Table II and FIG. 3, suitable application of the input signals to each of the decoder gates 301–308 is determined. For example, the first or topmost row of the table defines the input to gate 301, although, of course, reference to specific gates and rows is merely illustrative, since the order of the distribution of gates and rows of the table is arbitrary. The first and second input gates are added and the inputs, A and A′, B and B′, etc., connected, as specified by the table, to the decoder gates 301–308. The inverters, 309–316, connected to the output of decoder gates 301–308 provide the desired output level. The circuit of FIG. 3 is arranged to process the parity information along with the address bits in a manner similar to that of the circuit of FIG. 1 so as to produce a self-checking decoder.

Figure 3:
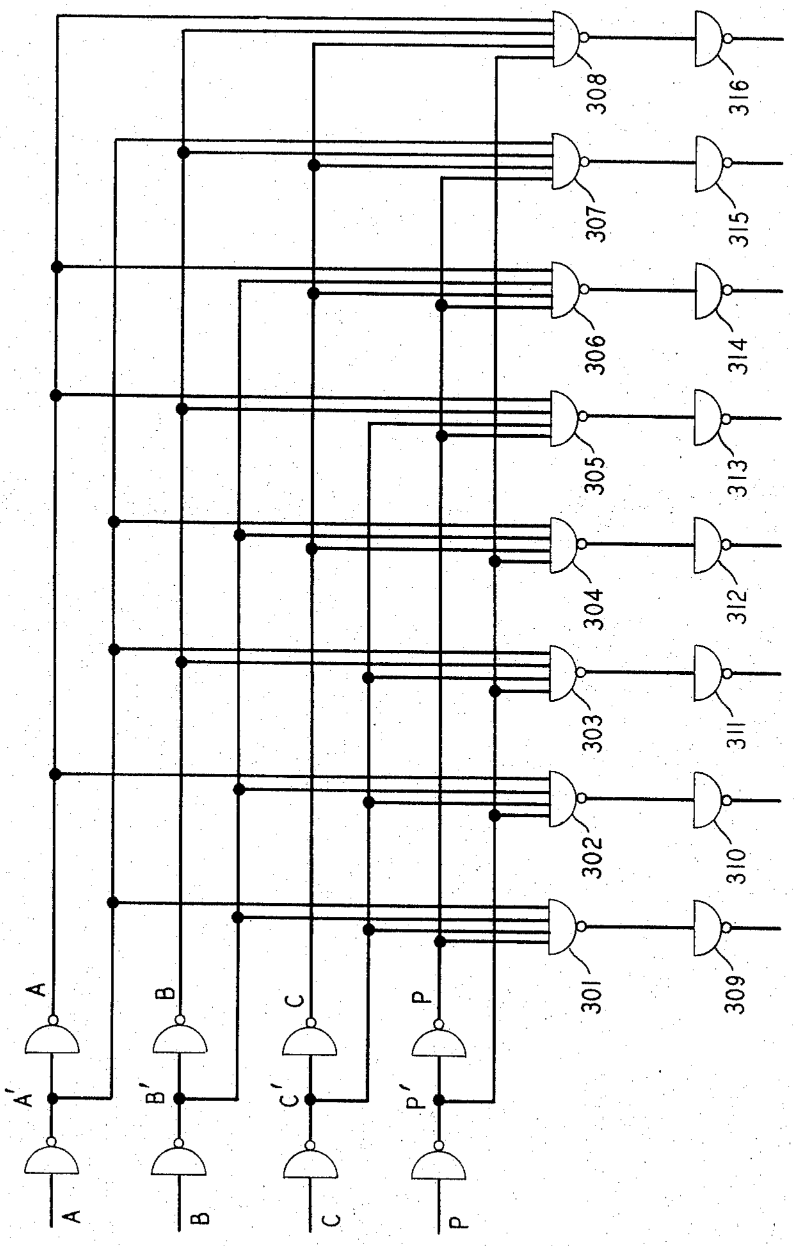
FIG. 3 illustrates a 1-out-of-8 decoder in accordance with the present invention.

Although not shown, it is clear that the output leads from gates 309–316 of FIG. 3 are advantageously applied to inverters and an AND gate to provide the all-0's check as described in the discussion above relating to FIG. 1

While the invention has been particularly shown and described with reference to a preferred embodiment thereof, it will be understood by those skilled in the art that various changes in form and detail may be made thereto without departing from the spirit and scope of the invention. In particular, as indicated, although the present invention was described with reference to specific decoders, the principles of the present invention suggests its application to all one-out-of-*n* decoders. Further, it is apparent that the principles of the present invention apply to arrangements utilizing positive logic as well as negative logic even though the discussion specified positive logic. Also, it will be apparent to those skilled in the art that additional gates can be provided to process more than one check or parity bit.

What is claimed is:

1. A self-checking decoder for generating an output signal on one of $m$ output lines in response to an $n$-tuple of address and parity signals comprising a. means for applying said $n$-tuple to respective first input leads and for generating the complement of said $n$-tuple on respective second input leads, b. $m$ $n$-input AND circuits whose inputs are selectively connected to mutually exclusive combinations of $n$ of said first and second input leads, and c. means connecting the outputs of each of said $n$-input AND circuits to a different one of said $m$ output lines.

2. Apparatus according to claim 1 wherein $m = 2^{n-a}$ where a $\geqslant$ 1 is the number of parity signals.

3. Apparatus according to claim 2 further comprising an input decoder for generating an output signal whenever a valid $n$-tuple is applied to said first input leads.

4. Apparatus according to claim 3 wherein said parity signals are chosen in the absence of error to maintain the mod 2 sum of said $n$-tuple equal to 1 and wherein said input decoder comprises an $n$-input OR circuit and means for connecting the $n$-inputs of said OR circuit to respective ones of said $n$ first input leads.

5. Apparatus according to claim 3 further comprising an output decoder for detecting when at least one of the output leads of said $n$-input AND circuits assumes a preselected condition.

6. Apparatus according to claim 5 wherein said output decoder comprises an $m$-input OR circuit and means for connecting the $m$-inputs of said OR circuit to respective ones of said output leads.

7. Apparatus according to claim 5 further comprising a. an error generator for supplying invalid $n$-tuples, and b. means responsive to said input and output decoder for indicating when an output on one of said output lines occurs when an invalid $n$-tuple occurs.

8. Apparatus according to claim 6 wherein said parity signals are chosen in the absence of error to maintain the modulo 2 sum of said $n$-tuple equal to 1 further comprising a. an $n$-input OR circuit and means for connecting the $n$-inputs of said $n$-input OR circuit to respective ones of said $n$ first input leads, and b. a 2-input AND circuit whose inputs are connected to the output leads of said $n$-input and $m$-input OR circuits.

9. Apparatus according to claim 8 wherein each of said $n$-input AND circuits comprises an $n$-input NAND gate and an inverter whose input is connected to the output of said NAND gate and whose output is connected to a respective output line.

10. Apparatus according to claim 9 wherein said means for applying said $n$-tuple to respective first input leads comprises $n$ inverters whose inputs are connected to individual ones of said second input leads and whose outputs are connected to respective ones of said first input leads.

11. Apparatus according to claim 1 comprising means for detecting when no outputs appear on said output lines.

* * * * *